(12) United States Patent
Sasahara

(10) Patent No.: US 11,392,191 B2
(45) Date of Patent: Jul. 19, 2022

(54) APPARATUS, METHOD, AND RECORDING MEDIUM FOR SHIFTING A POWER MODE TO A POWER SAVING MODE BASED ON AN INTERRUPT SIGNAL

(71) Applicant: CANON KABUSHIKI KAISHA, Tokyo (JP)

(72) Inventor: Naoto Sasahara, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/897,034

(22) Filed: Jun. 9, 2020

(65) Prior Publication Data

US 2020/0393892 A1 Dec. 17, 2020

(30) Foreign Application Priority Data

Jun. 17, 2019 (JP) .............................. JP2019-112318

(51) Int. Cl.
| | |
|---|---|
| *G06F 1/3234* | (2019.01) |
| *H04N 1/00* | (2006.01) |
| *G06F 13/42* | (2006.01) |
| *G06F 13/24* | (2006.01) |
| *G06F 1/3293* | (2019.01) |

(52) U.S. Cl.
CPC .......... *G06F 1/3234* (2013.01); *G06F 1/3284* (2013.01); *G06F 1/3293* (2013.01); *G06F 13/24* (2013.01); *G06F 13/4282* (2013.01); *H04N 1/00896* (2013.01); *G06F 2213/0042* (2013.01); *Y02D 10/00* (2018.01)

(58) Field of Classification Search
CPC .... G06F 1/3234; G06F 1/3243; G06F 1/3284; G06F 1/3287; G06F 1/3293; G06F 13/4282; G06F 2213/0042; H04N 1/00896
See application file for complete search history.

(56) References Cited

U.S. PATENT DOCUMENTS

| | | | | |
|---|---|---|---|---|
| 9,323,312 | B2 * | 4/2016 | Menard | G06F 1/3203 |
| 9,696,789 | B2 * | 7/2017 | Ahmad | G06F 1/3215 |
| 10,747,298 | B2 * | 8/2020 | Gada | G06F 9/4812 |
| 11,064,084 | B2 * | 7/2021 | Obata | H04N 1/0097 |
| 2007/0204180 | A1 * | 8/2007 | Huang | G06F 1/3203 |
| | | | | 713/320 |

(Continued)

FOREIGN PATENT DOCUMENTS

JP          2005-267099 A          9/2005

*Primary Examiner* — Thomas J. Cleary
(74) *Attorney, Agent, or Firm* — Canon U.S.A., Inc. IP Division

(57) ABSTRACT

An apparatus includes a first control unit configured to shift to at least a first power mode and a second power mode where power saving is greater than that in the first power mode, a detection unit configured to detect a predetermined return factor and output a first signal, a second control unit, which includes a storage unit storing information about input of the first signal, configured to output a second signal based on the stored information, and a third control unit configured to output a third signal for shifting the first control unit from the second power mode to the first power mode based on the second signal. The third control unit sets a predetermined value in the storage unit when the first control unit shifts to the second power mode.

9 Claims, 8 Drawing Sheets

(56) References Cited

U.S. PATENT DOCUMENTS

| | | | |
|---|---|---|---|
| 2007/0260358 A1* | 11/2007 | Katoh | G06F 1/3246 700/286 |
| 2009/0164817 A1* | 6/2009 | Axford | G06F 1/3203 713/322 |
| 2009/0207423 A1* | 8/2009 | Shimizu | G06F 1/32 358/1.1 |
| 2009/0235271 A1* | 9/2009 | Utsumi | G06F 9/5016 718/104 |
| 2009/0240966 A1* | 9/2009 | Katoh | G06F 1/3203 713/323 |
| 2009/0259863 A1* | 10/2009 | Williams | G06F 1/3203 713/323 |
| 2011/0208986 A1* | 8/2011 | Soga | G03G 15/5083 713/323 |
| 2011/0254597 A1* | 10/2011 | Kii | G06F 1/3237 327/143 |
| 2011/0282512 A1* | 11/2011 | Shimizu | H04N 1/00885 700/297 |
| 2012/0047402 A1* | 2/2012 | Chen | G06F 1/3203 714/38.13 |
| 2012/0079300 A1* | 3/2012 | Hachisuga | H04N 5/232411 713/320 |
| 2013/0061080 A1* | 3/2013 | Shimizu | H04N 1/00904 713/323 |
| 2014/0059365 A1* | 2/2014 | Heo | G06F 1/3206 713/320 |
| 2015/0262050 A1* | 9/2015 | Kitora | G06K 15/4055 358/1.13 |
| 2015/0373222 A1* | 12/2015 | Wang | H04N 1/00891 358/1.13 |
| 2016/0026232 A1* | 1/2016 | Yamashita | G06F 9/4418 713/323 |
| 2016/0057304 A1* | 2/2016 | Yamaguchi | H04N 1/00891 358/1.14 |
| 2017/0013155 A1* | 1/2017 | Yokoyama | H04N 1/00323 |
| 2017/0013156 A1* | 1/2017 | Horishita | H04N 1/00058 |
| 2017/0161096 A1* | 6/2017 | Loh | G06F 13/24 |
| 2017/0244854 A1* | 8/2017 | Ito | H04N 1/00928 |
| 2018/0321732 A1* | 11/2018 | Fukushi | G06F 3/1204 |

* cited by examiner

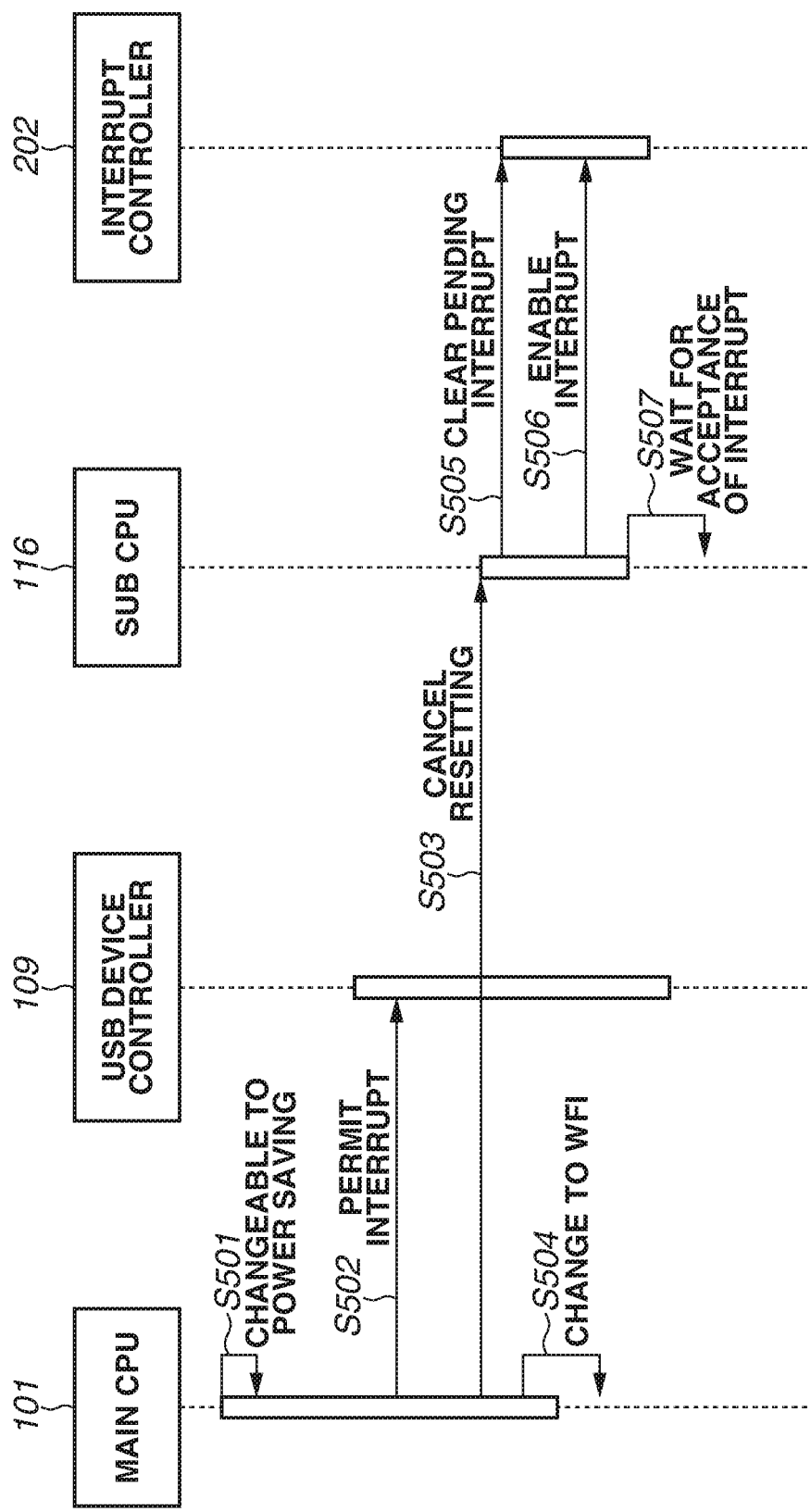

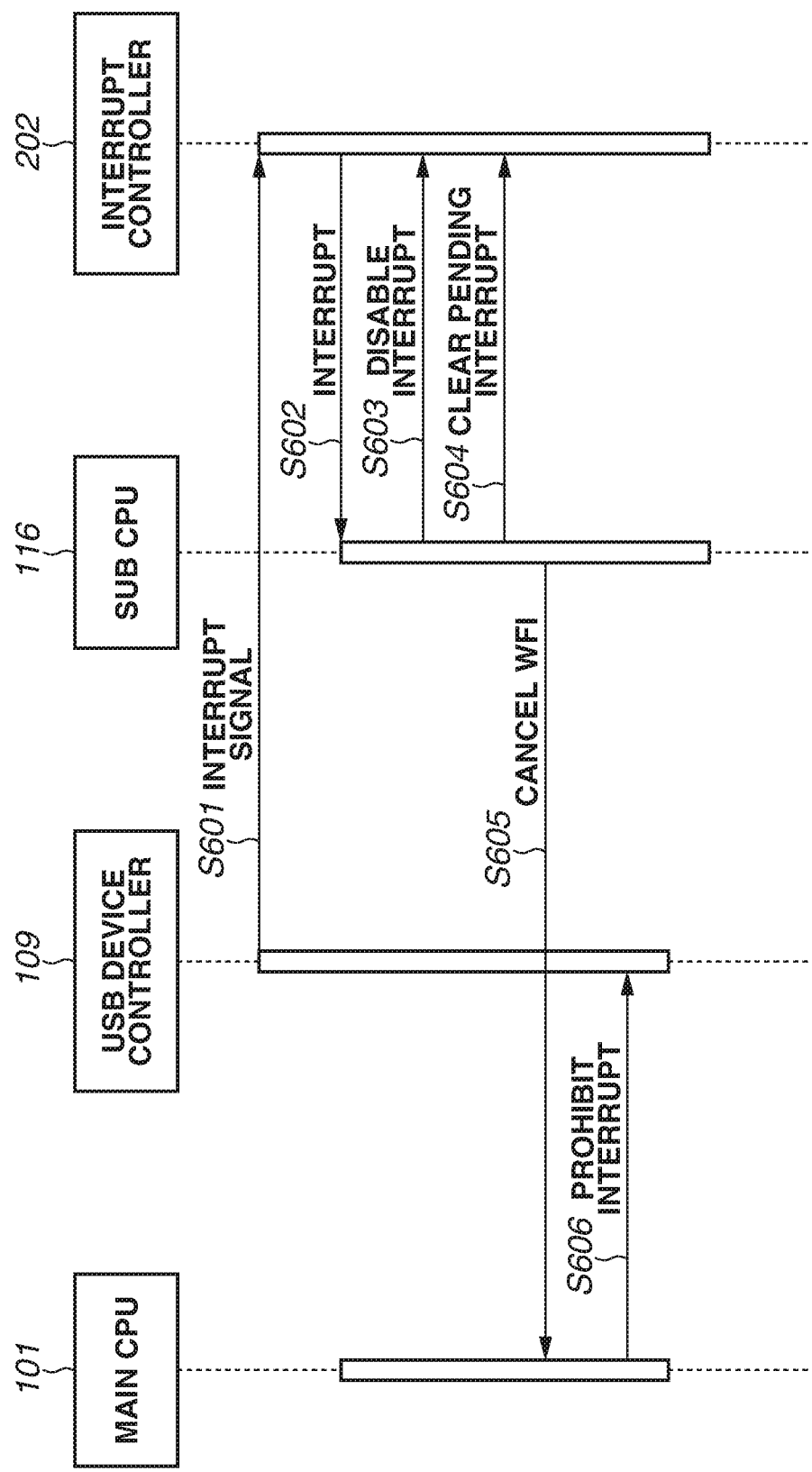

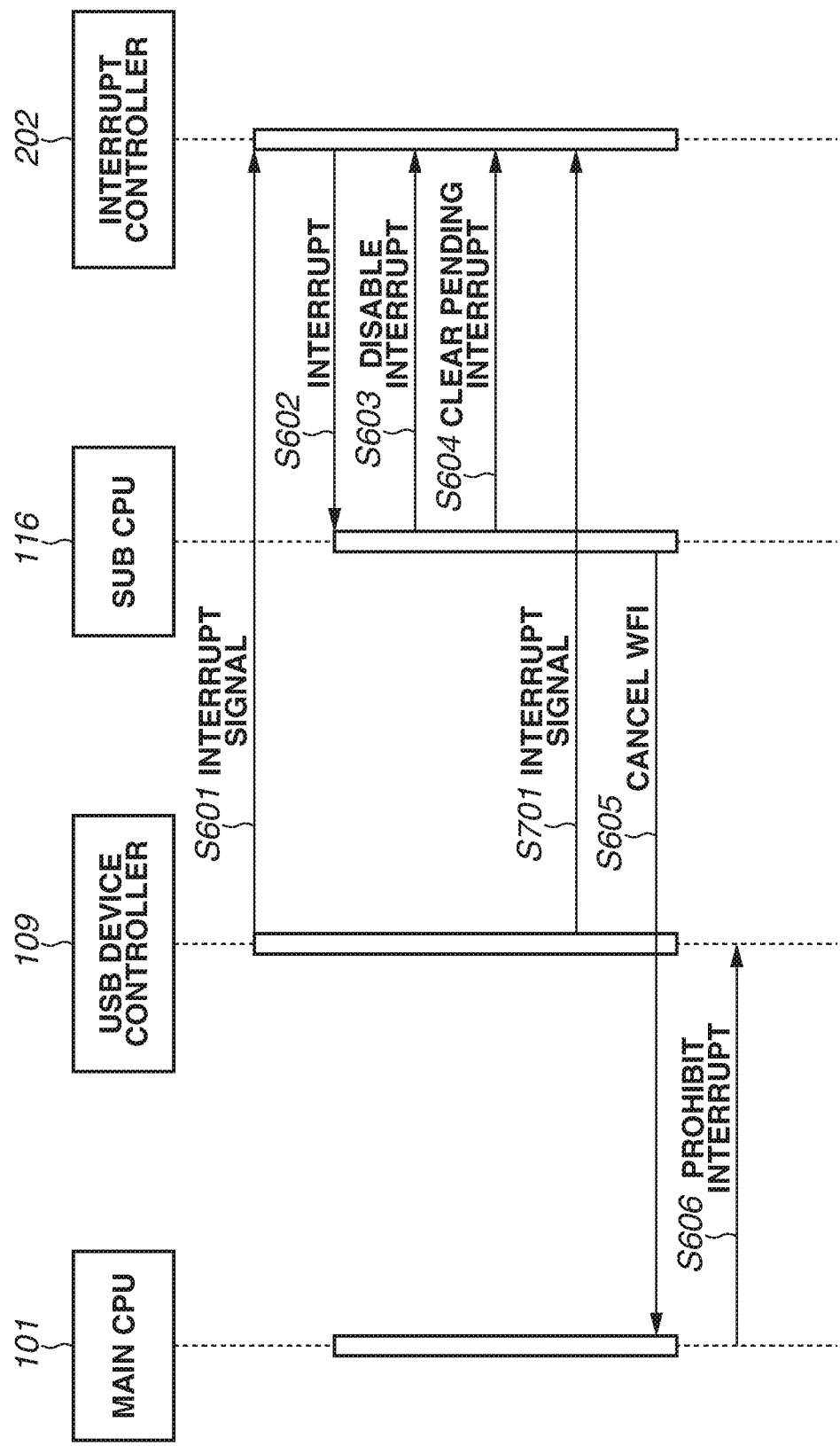

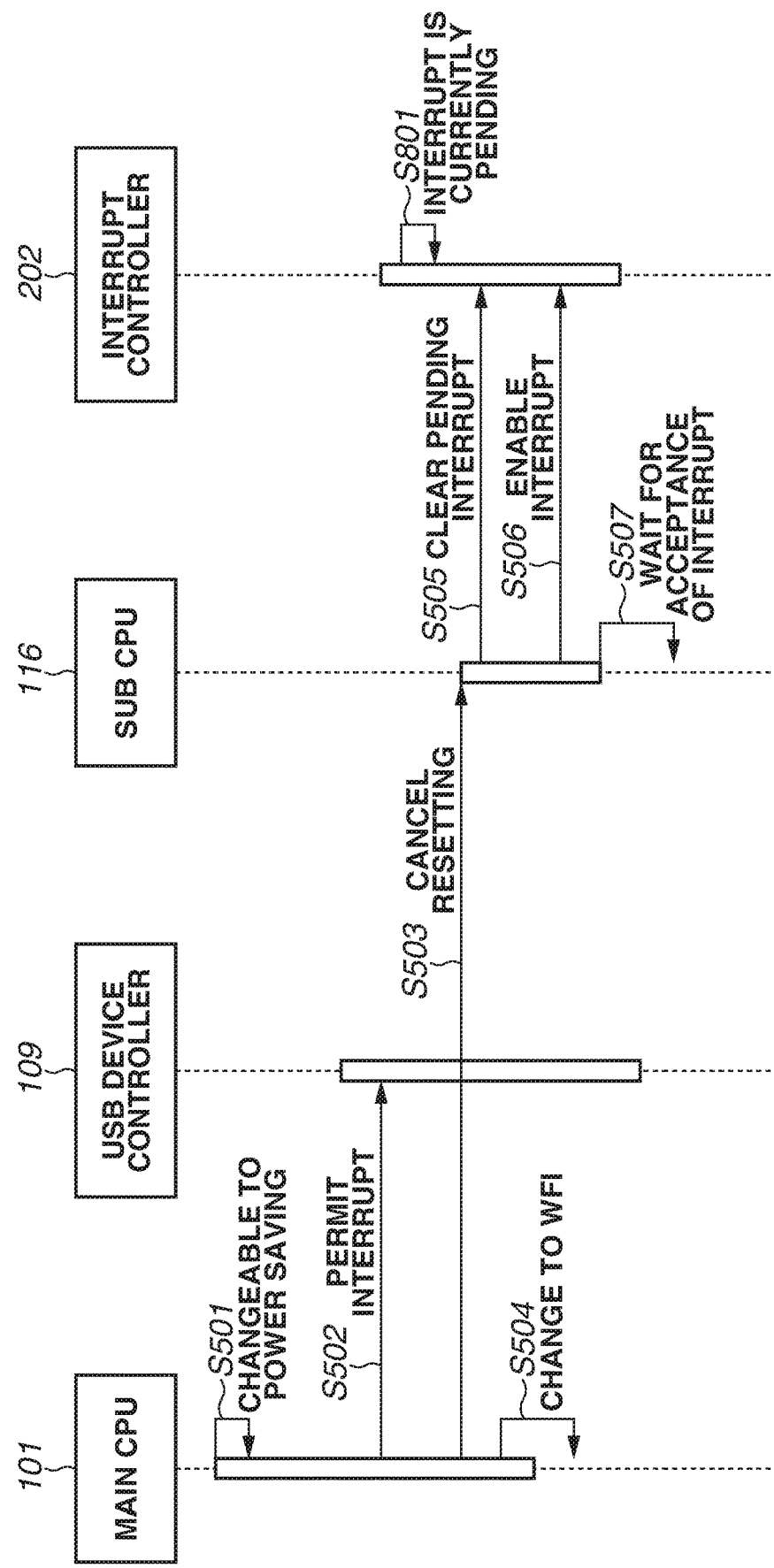

APPARATUS, METHOD, AND RECORDING MEDIUM FOR SHIFTING A POWER MODE TO A POWER SAVING MODE BASED ON AN INTERRUPT SIGNAL

BACKGROUND OF THE INVENTION

Field of the Invention

The aspect of the embodiments relates to an information processing apparatus that is capable of initializing a storage unit, which stores information to be stored when a return factor is detected.

Description of the Related Art

An information processing apparatus such as an image forming apparatus is communicably connected to an external apparatus via a communication interface represented by a network interface or a Universal Serial Bus (USB) interface. The image forming apparatus has a function for printing image data received from the external apparatus.

The information processing apparatus such as the image forming apparatus has a power saving state to reduce power consumption as well as a normal power state. In the power saving state, power supply to a whole or a part of a main system stops. The main system includes a main central processing unit (CPU) that operates in the normal power state, and a memory. In the power saving state, power is supplied only to some subsystems such as a sub CPU and an interrupt controller. The sub CPU is necessary for return from the power saving state. The interrupt controller outputs an interrupt signal to the sub CPU.

The image forming apparatus returns from the power saving state to the normal power state based on a predetermined operation performed by a user or predetermined data from the external apparatus. The subsystem that operates in the power saving state detects the predetermined data transmitted by the external apparatus to cause the main system to return. Further, the subsystem that operates in the power saving state detects the predetermined operation performed by the user to cause the main system to return. Japanese Patent Application Laid-Open No. 2005-267099 discusses a multi-function peripheral, which includes a main system and subsystems and stops power supply to the main system in the power saving state.

While the information processing apparatus is returning from the power saving state upon detection of a certain return factor, the subsystem sometimes detects another return factor. In this case, information for return of the main system may be pended in the subsystem. The information pended in the subsystem causes the main system to immediately return based on the information pended in the subsystem when the information processing apparatus shifts next to the power saving.

SUMMARY OF THE INVENTION

According to an aspect of the embodiments, an apparatus includes a first control unit configured to shift to at least a first power mode and a second power mode where power saving is greater than that in the first power mode, a detection unit configured to detect a predetermined return factor and output a first signal, a second control unit, which includes a storage unit storing information about input of the first signal, configured to output a second signal based on the stored information, and a third control unit configured to output a third signal for shifting the first control unit from the second power mode to the first power mode based on the second signal. The third control unit sets a predetermined value in the storage unit when the first control unit, which has shifted to the first power mode, shifts to the second power mode.

Further features of the disclosure will become apparent from the following description of exemplary embodiments with reference to the attached drawings.

BRIEF DESCRIPTION OF THE DRAWINGS

FIG. 5 is a sequence diagram illustrating processing for a shift of the image forming apparatus to a power saving state.

FIG. 6 is a sequence diagram illustrating processing for return of the image forming apparatus from the power saving state.

FIG. 7 is a sequence diagram illustrating an example where an interrupt signal is input again just after a pended value is cleared.

FIG. 8 is a sequence diagram illustrating processing for clearing a pended value of a register.

DESCRIPTION OF THE EMBODIMENTS

Figure 1:
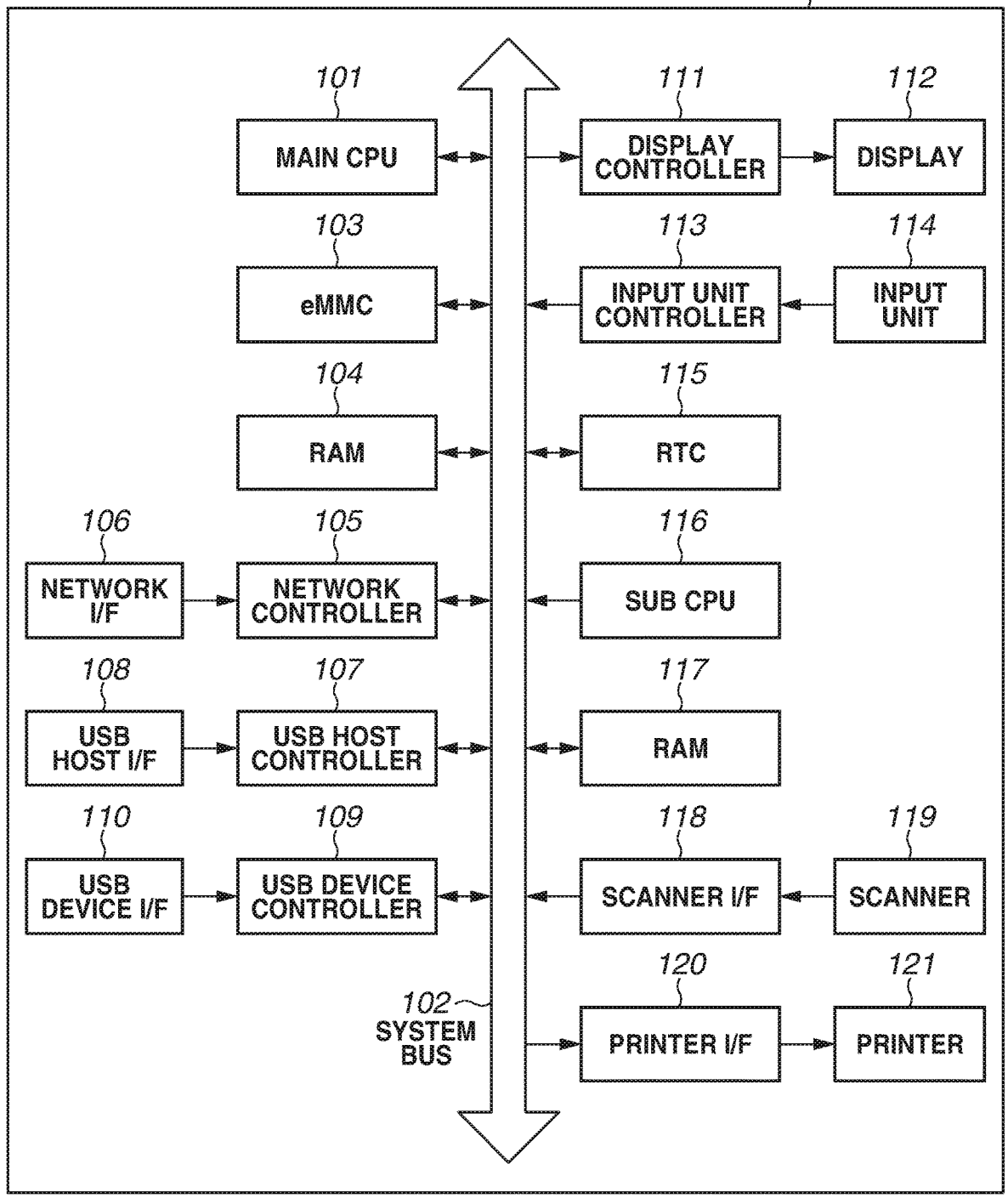
FIG. 1 is a hardware block diagram illustrating an image forming apparatus.

An exemplary embodiment of the disclosure will be described below with reference to the drawings. The following exemplary embodiment does not limit the claimed invention, and not all combinations of features described in the exemplary embodiment are essential for the solving means of the disclosure.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

FIG. 1 is a hardware block diagram illustrating an image forming apparatus. A whole configuration of an image forming apparatus 1 will be described with reference to FIG. 1.

The image forming apparatus 1 includes a main central processing unit (CPU) 101, a system bus 102, and a sub-CPU 116. The main CPU 101 executes software. The system bus 102 is a path for the main CPU 101 and other units transmitting and receiving data. The sub-CPU 116 monitors interrupt from each hardware when the image forming apparatus 1 is in a power saving state. The main CPU 101 can shift to at least a first power mode and a second power mode (for example, a Wait for Interrupt (WFI) state) where power saving is greater than that in the first power mode. The sub-CPU 116 has a function for waking the main CPU 101 upon input of an interrupt signal. The image forming apparatus 1 includes an embedded Multi Media Card (eMMC) 103. The eMMC 103 stores software to be executed by the main CPU 101, software to be executed by the sub-CPU 116, a database to be used when the image forming apparatus 1 operates, and a temporary saving file. The eMMC 103 can be a large-capacity nonvolatile memory such as a hard disk drive (HDD) or a solid state drive (SSD). The image forming apparatus 1 includes a random access memory (RAM) 104 where a program is developed. The RAM 104 is a storage area for variables at a time of program execution and data to be transmitted from each unit using direct memory access (DMA). The image forming apparatus 1 further includes a RAM 117 where a program to be executed by the sub-CPU 116 is developed. The RAM 117 stores information for specifying a device that causes the image forming apparatus 1 to return. The main CPU 101 can access also to the RAM 117.

The image forming apparatus 1 includes a network controller 105 that communicates with another apparatus on a network, and a network interface (I/F) 106 that is connected to a network cable. The image forming apparatus 1 further includes a Universal Serial Bus (USB) host controller 107 that communicates with a USB device, and a USB host I/F 108 that is connected to a USB device or a USB cable. In FIG. 1, one USB host I/F 108 is provided, but a plurality of USB host I/Fs 108 can be provided. The image forming apparatus 1 further includes a USB device controller 109 that communicates with a USB host, and a USB device I/F 110 that is connected to the USB cable connected to the USB host. When the image forming apparatus 1 functions as the USB device, the USB device controller 109 receives print data transmitted by the USB host via the USB device I/F 110. Further, when the image forming apparatus 1 functions as the USB device, the USB device controller 109 transmits image data scanned by the image forming apparatus 1 to the USB host via the USB device I/F 110.

The image forming apparatus 1 includes a display 112 and a display controller 111 that causes the display 112 to perform display. The display 112 shows various screens. The image forming apparatus 1 includes an input unit 114 that accepts input from a user, and an input unit controller 113 that controls the input unit 114. The input unit 114 is, for example, a keyboard, a mouse, a numeric keypad, cursor keys, or a touch panel. In a case where the input unit 114 is the touch panel, the touch panel is mounted onto a surface of the display 112. The image forming apparatus 1 includes a real-time clock (hereinafter, RTC) 115 having a time counting function, an alarm function, and a timer function.

The image forming apparatus 1 is a multi-function apparatus having a print function, a scanning function, a copy function, and a data transmission function. The image forming apparatus 1 includes a scanner (reading unit) 119 having the scanning function for scanning a document image, and a scanner I/F 118 that transmits image data scanned by the scanner 119 to the system bus 102. The image forming apparatus 1 further includes a printer (print unit) 121 having the print function for printing an image on paper, and a printer I/F 120 that transmits image data to the printer 121.

Figure 2:
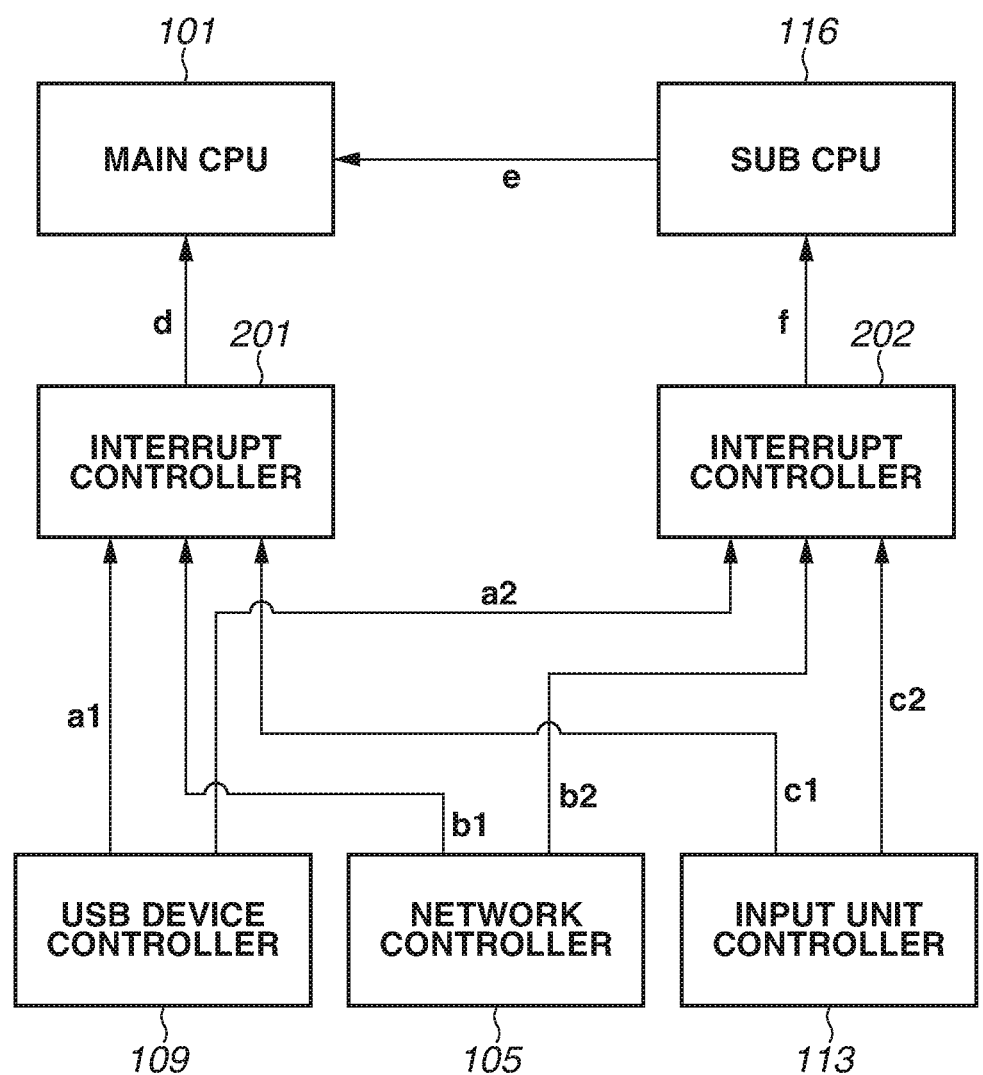
FIG. 2 is a block diagram describing an interrupt controller and its peripheral devices.

FIG. 2 is a block diagram describing an interrupt controller and its peripheral devices. Each hardware of the USB device controller 109, the network controller 105, and the input unit controller 113 transmits interrupt signals a1, a2, b1, b2, c1, and c2 to interrupt controllers 201 and 202. The main CPU 101 activates a handler to execute register setting processing and data communication processing on each hardware based on an interrupt signal d, which is input from the interrupt controller 201. The sub-CPU 116 activates an interrupt handler to execute processing for return from the power saving state based on an interrupt signal f, which is input from the interrupt controller 202. The hardware that outputs an interrupt signal is not limited to the USB device controller 109, the network controller 105, and the input unit controller 113. For example, a sensor that detects a document to be read by the scanner 119, the RTC 115, or a human presence sensor, not illustrated, can output an interrupt signal.

Figure 3:
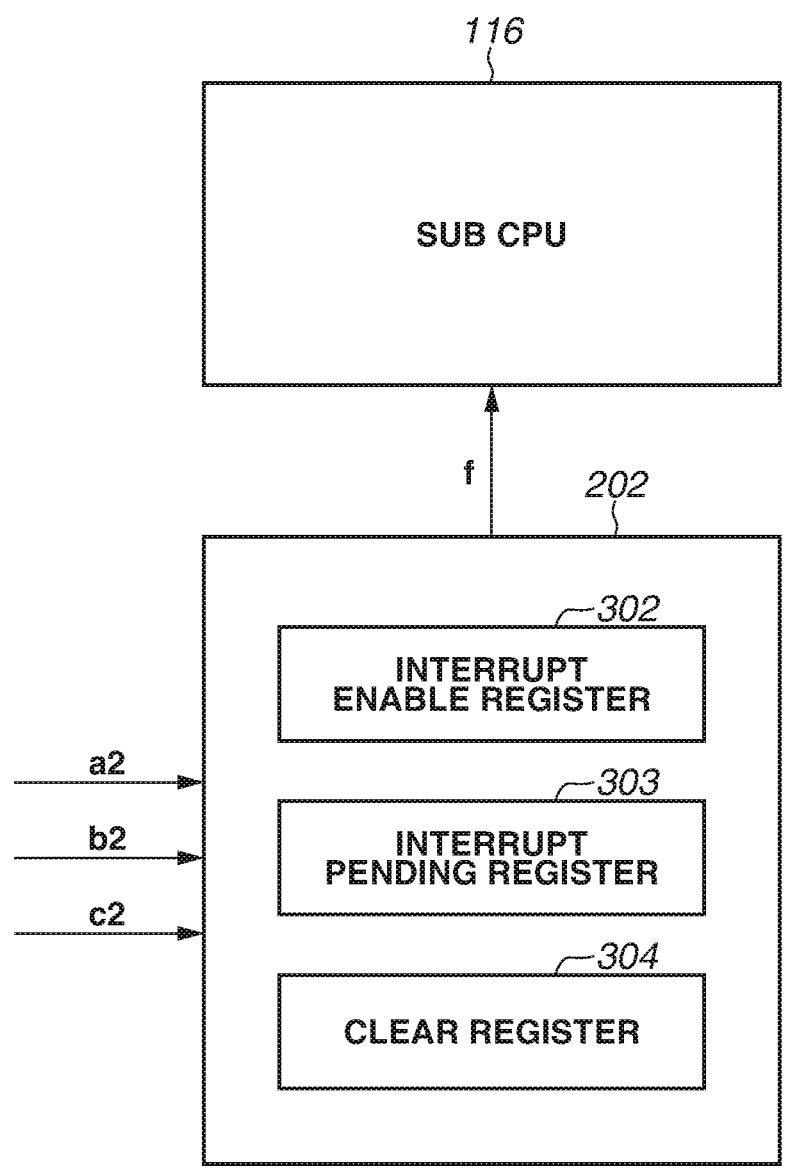
FIG. 3 is a block diagram illustrating details of the interrupt controller.

FIG. 3 is a block diagram illustrating details of the interrupt controller 202. The interrupt controller 202 includes a plurality of registers as storage units. The interrupt signals a2, b2, and c2 to be input are pended in an interrupt pending register 303. The interrupt pending register 303 has a plurality of bits. Each hardware is allocated to each of the bits. For example, the interrupt pending register 303 has the bit for the USB device controller 109. When the interrupt signal a2 is input from the USB device controller 109, the bit for the USB device controller 109 indicates 1. Further, the interrupt pending register 303 has the bit for the network controller 105. When the interrupt signal b2 is input from the network controller 105, the bit for the network controller 105 indicates 1. Furthermore, the interrupt pending register 303 has the bit for the input unit controller 113. When the interrupt signal c2 is input from the input unit controller 113, the bit for the input unit controller 113 indicates 1. The bits for the hardware in the interrupt pending register 303 make it possible to determine hardware from which an interrupt signal is input. The sub-CPU 116 determines hardware from which an interrupt signal is input, and stores information for specifying the hardware from which the interrupt signal is output to the RAM 117. The sub-CPU 116, which has received the interrupt signal f, refers to the interrupt pending register 303 to specify a device which has interrupted, and stores information about the device in the RAM 117.

An interrupt enable register 302 sets interrupt from hardware to "enable" or "disable". The interrupt enable register 302 also has a plurality of bits like the interrupt pending register 303. The plurality of bits corresponds to the plurality of bits in the interrupt pending register 303. If a predetermined bit of the interrupt enable register 302 indicates 1 ("enable"), the interrupt signal f is output to the sub-CPU 116 based on the bit of the interrupt pending register 303 corresponding to the predetermined bit. On the other hand, if the predetermined bit of the interrupt enable register 302 indicates 0 ("disable"), the interrupt signal f is not output to the sub-CPU 116 even in a case where the bit of the interrupt pending register 303 corresponding to the predetermined bit indicates 1.

A clear register 304 clears the bits set in the interrupt pending register 303. Clearing the bits is to set bit values to initial values. The clear register 304 also has a plurality of bits like the interrupt pending register 303. The plurality of bits corresponds to the plurality of bits of the interrupt pending register 303. When 1 is written into a predetermined bit of the clear register 304, the bit of the interrupt pending register 303 corresponding to the predetermined bit is cleared to 0. A value pended in the interrupt pending register 303 remains pended until 1 is written into the bit of the clear register 304.

Figure 4:
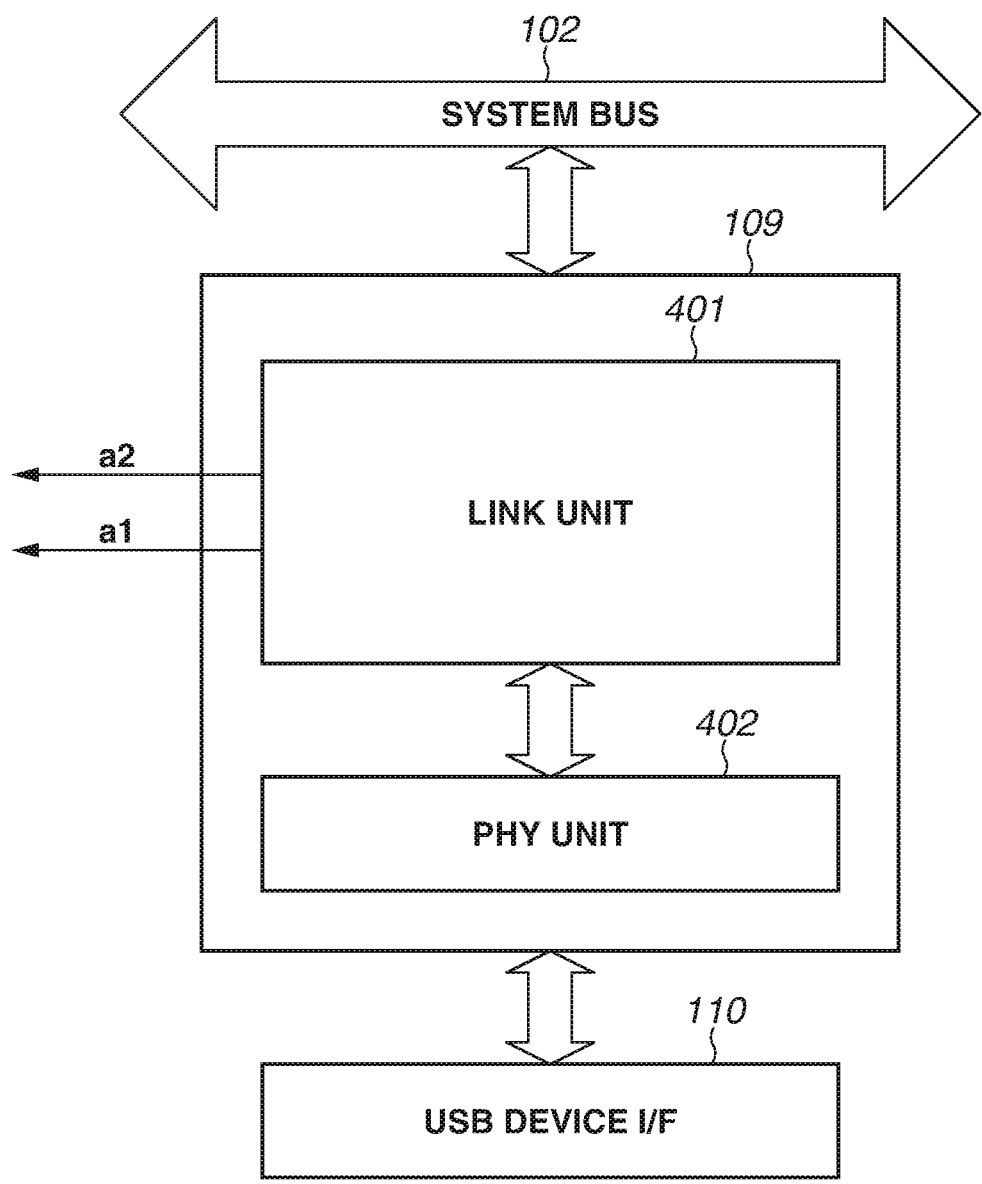
FIG. 4 is a detailed diagram illustrating a Universal Serial Bus (USB) device controller.

FIG. 4 is a detailed diagram illustrating the USB device controller 109. The USB device controller 109 includes a link unit 401 and a physical layer (PHY) unit 402. The link unit 401 makes data communication with the main CPU 101 via the system bus 102. Further, the link unit 401 has a function for holding descriptor information for functioning as a USB device, and a function for outputting the interrupt signals a1 and a2. The PHY unit 402 has a function for making data communication with an external USB host via the USB device I/F 110. The network controller 105 and the input unit controller 113 also have functions similar to the USB device controller 109, but description about them is omitted.

FIG. 5 is a sequence diagram illustrating processing for a shift of the image forming apparatus 1 to the power saving state.

When a condition for the shift to the power saving state is satisfied, in step S501, the main CPU 101 determines that the shift to the power saving state is possible. The condition for the shift to the power saving state is, for example, a key manipulation, not illustrated, for the shift to the power saving state, or a state that a time that elapses while the input unit 114 has not been operated becomes a threshold. In a case where the determination is made that the shift to the power saving state is possible, in step S502, the main CPU 101 permits interruption of the USB device controller 109. The interrupt permission specifically means that the main CPU 101 writes 1 as information for permitting interruption into a predetermined register of the USB device controller 109. In step S503, the main CPU 101 cancels reset of the sub-CPU 116. That is, a reset signal is set to a high level. The sub-CPU 116 of which reset has been canceled becomes operable. The sub-CPU 116 is in a shutdown state during the reset (the reset signal is at a low level). Further, in step S504, the main CPU 101 shifts from the first power mode to the second power mode where power saving is greater than in the first power mode. The second power mode is, for example, a Wait for Interrupt (WFI) state. The WFI state is a standby state, namely, a mode where the power consumption of the main CPU 101 can be suppressed. When an interrupt signal e is input in the WFI state, the main CPU 101 returns from the WFI state to a normal state. The sub-CPU 116 of which the reset has been canceled reads out a program developed in the RAM 117 from a predetermined address to execute the program. In the present exemplary embodiment, in step S505, the sub-CPU 116 executes processing for clearing the register pended in the interrupt controller 202. The processing for clearing pended interrupt in step S505 is processing for writing 1 into the bit of the clear register 304 of the interrupt controller 202. The sub-CPU 116 can clear all the bits or only a specific bit of the interrupt pending register 303. In step S506, the sub-CPU 116 executes processing for enabling interrupt from the interrupt controller 202. The processing for enabling the interrupt in step S506 is processing for writing 1 into the bit of the interrupt enable register 302 of the interrupt controller 202. The sub-CPU 116 can write 1 into all the bits or only a specific bit of the interrupt enable register 302. Thereafter, the sub-CPU 116 becomes in the standby state in step S507, and waits until the interrupt signal f is input from the interrupt controller 202.

FIG. 6 is a sequence diagram illustrating processing for causing the image forming apparatus 1 to return from the power saving state.

When the USB device controller 109 receives a packet via the USB device I/F 110, in step S601, the USB device controller 109, which has received the packet, outputs the interrupt signal a2 to the interrupt controller 202. When detecting the reception of the packet as a return factor, the USB device controller 109 outputs the interrupt signal a2. The USB device controller 109 can output the interrupt signal a2 regardless of contents of the packet, or can output the interrupt signal a2 when the packet is a specific packet.

In step S602, the interrupt controller 202, which has received the interrupt signal a2, outputs the interrupt signal f to the sub-CPU 116. In step S603, the sub-CPU 116, which has received the interrupt signal f, executes processing for disabling the interrupt from the interrupt controller 202. The disabling processing in step S603 is processing for writing 0 into a predetermined bit of the interrupt enable register 302 of the interrupt controller 202. In step S604, the sub-CPU 116 then executes processing for clearing a value pended in the interrupt controller 202. The clearing processing in step S604 is processing for writing 0 into a predetermined bit of the clear register 304 of the interrupt controller 202. When 0 is written into the predetermined bit of the clear register 304, the corresponding predetermined bit of the interrupt pending register 303 is cleared.

In step S605, the sub-CPU 116 then outputs the interrupt signal e to the main CPU 101 to cause the main CPU 101 to return from the WFI state. In step S606, the main CPU 101, which has returned from the WFI state, sets prohibition of interrupt in the USB device controller 109.

FIG. 7 is a diagram illustrating an example where an interrupt signal is input again just after a value pended in the interrupt controller 202 is cleared. After the sub-CPU 116 executes the processing for clearing the value pended in the interrupt controller 202 in step S604, the USB device controller 109 receives a packet again via the USB device I/F 110. As a result, in step S701, the USB device controller 109, which has received the packet, outputs the interrupt signal a2 to the interrupt controller 202. At this time, the predetermined bit of the interrupt pending register 303 indicates 1. The sub-CPU 116 disables the interrupt from the interrupt controller 202, and thus the interrupt controller 202 does not output the interrupt signal f. The predetermined bit of the interrupt pending register 303 of the interrupt controller 202 is not cleared.

FIG. 8 is a diagram illustrating processing for clearing a value of a register pended in step S701. As described above, in step S801, the predetermined bit of the interrupt pending register 303 of the interrupt controller 202 is not cleared. In this situation, if the condition for the shift to the power saving state is satisfied, in step S505, the sub-CPU 116 clears the interrupt pended in the interrupt controller 202. As a result, the predetermined bit, which has not been cleared, of the interrupt pending register 303 is cleared. As a result, even if the processing for enabling the interrupt from the interrupt controller 202 is executed in step S506, the image forming apparatus 1, which has shifted to the power saving state, does not immediately return from the power saving state.

In the above exemplary embodiment, in step S505, the sub-CPU 116 clears the predetermined bit of the interrupt pending register 303, but the main CPU 101 can clear the predetermined bit of the interrupt pending register 303. Further, a device other than the main CPU 101 and the sub-CPU 116 can clear the predetermined bit of the interrupt pending register 303.

In the above exemplary embodiment, the main CPU 101 clears the predetermined bit of the interrupt pending register 303 based on the condition for the shift to the EFI state in step S501. However, a timing at which the predetermined bit is cleared is not limited to the above-described condition for the shift. For example, the predetermined bit can be cleared at a predetermined timing after the interruption is enabled in step S506. Alternatively, a predetermined bit can be periodically cleared.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-112318, filed Jun. 17, 2019, which is hereby incorporated by reference herein in its entirety.

What is claimed is:

1. An apparatus comprising:
   a main controller configured to operate in a power mode and configured to operate in a power saving mode in which less power is consumed than in the power mode;
   a device controller configured to issue an interrupt signal to an interrupt controller;
   the interrupt controller configured to forward the interrupt signal to a sub controller when forwarding of the interrupt signal is enabled, and configured to store the interrupt signal when forwarding of the interrupt signal is disabled; and
   the sub controller configured to, in response to receiving the interrupt signal from the interrupt controller, (a) disable forwarding by the interrupt controller of a subsequent interrupt signal and (b) shift a mode of the main controller from the power saving mode to the power mode,
   wherein the sub controller is configured to, when the mode of the main controller is shifted from the power mode to the power saving mode, clear a subsequent interrupt signal stored in the interrupt controller, which has been subsequently received by the interrupt controller from the device controller, and then enable the interrupt controller to forward a subsequent interrupt signal.

2. The apparatus according to claim 1, further comprising a print unit configured to print an image on paper.

3. The apparatus according to claim 1, further comprising a reading unit configured to read a document image.

4. A method comprising:
   performing operating in a power mode and performing operating in a power saving mode in which less power is consumed than in the power mode;
   issuing an interrupt signal to an interrupt controller;

forwarding the interrupt signal to a sub controller when forwarding of the interrupt signal is enabled, and storing the interrupt signal when forwarding of the interrupt signal is disabled; and in response to receiving the interrupt signal from the interrupt controller, (a) disabling forwarding by the interrupt controller of a subsequent interrupt signal and (b) shifting a mode from the power saving mode to the power mode, wherein when the mode is shifted from the power mode to the power saving mode, a subsequent interrupt signal stored in the interrupt controller is cleared, which has been subsequently received by the interrupt controller from a device controller, and then the interrupt controller is enabled to forward a subsequent interrupt signal.

5. The method according to claim 4, further comprising printing an image on paper.

6. The method according to claim 4, further comprising reading a document image.

7. A non-transitory computer-readable recording medium storing a computer-executable program of instructions for causing a computer to perform a method comprising:

performing operating in a power mode and performing operating in a power saving mode in which less power is consumed than in the power mode;

issuing an interrupt signal to an interrupt controller;

forwarding the interrupt signal to a sub controller when forwarding of the interrupt signal is enabled, and storing the interrupt signal when forwarding of the interrupt signal is disabled; and in response to receiving the interrupt signal from the interrupt controller, (a) disabling forwarding by the interrupt controller of a subsequent interrupt signal and (b) shifting a mode from the power saving mode to the power mode, wherein when the mode is shifted from the power mode to the power saving mode, a subsequent interrupt signal stored in the interrupt controller is cleared, which has been subsequently received by the interrupt controller from a device controller, and then the interrupt controller is enabled to forward a subsequent interrupt signal.

8. The non-transitory computer-readable recording medium according to claim 7, further comprising printing an image on paper.

9. The non-transitory computer-readable recording medium according to claim 7, further comprising reading a document image.

* * * * *